(12) United States Patent
Ahn (10) Patent No.: US 11,372,794 B2
(45) Date of Patent: Jun. 28, 2022

(54) DATA PROCESSING APPARATUS FOR ARBITRATION OF REQUESTS AND OPERATION METHOD THEREOF

(71) Applicant: SK hynix Inc., Icheon (KR)

(72) Inventor: Soo Hong Ahn, Icheon (KR)

(73) Assignee: SK hynix Inc., Icheon (KR)

( * ) Notice: Subject to any disclaimer, the term of this patent is extended or adjusted under 35 U.S.C. 154(b) by 127 days.

(21) Appl. No.: 16/866,857

(22) Filed: May 5, 2020

(65) Prior Publication Data

US 2021/0073162 A1 Mar. 11, 2021

(30) Foreign Application Priority Data

Sep. 11, 2019 (KR) .......... 10-2019-0112829

(51) Int. Cl.
*G06F 13/40* (2006.01)
*G06F 9/50* (2006.01)

(52) U.S. Cl.
CPC ........ *G06F 13/4031* (2013.01); *G06F 9/5011* (2013.01)

(58) Field of Classification Search
CPC .................. G06F 13/4031; G06F 9/5011
See application file for complete search history.

(56) References Cited

U.S. PATENT DOCUMENTS

| 2001/0039605 A1* | 11/2001 | Uematsu | G06F 13/1668 711/154 |
| 2003/0079068 A1* | 4/2003 | Barrick | G06F 9/546 710/52 |
| 2006/0101179 A1* | 5/2006 | Lee | G06F 13/364 710/113 |
| 2014/0241376 A1 | 8/2014 | Balkan et al. | |
| 2016/0188529 A1* | 6/2016 | Nagarajan | G06F 13/1663 711/151 |
| 2020/0081622 A1* | 3/2020 | Mathews | G06F 3/061 |
| 2020/0081652 A1* | 3/2020 | Nukala | G06F 9/544 |
| 2020/0133905 A1* | 4/2020 | Mathews | G06F 13/1642 |

FOREIGN PATENT DOCUMENTS

| KR | 1020070086640 A | 8/2007 |
| KR | 100947745 B1 | 3/2010 |

\* cited by examiner

*Primary Examiner* — Phong H Dang (57) ABSTRACT

A data processing apparatus may include a master device, a slave device, and a controller configured to arbitrate communication between the master device and the slave device by: setting a respective Time-out Counter (TC) for each of requests transmitted from the master device, allocating one or more virtual channels to each of one or more request groups, the one or more virtual channels respectively corresponding to priority levels, associating a request with a virtual channel corresponding to the priority level of the request, for each request group, selecting one of the leading requests of the respective virtual channels according to the TCs and transmitting the selected request to the slave device.

13 Claims, 10 Drawing Sheets

DATA PROCESSING APPARATUS FOR ARBITRATION OF REQUESTS AND OPERATION METHOD THEREOF

CROSS-REFERENCES TO RELATED APPLICATION

The present application claims priority under 35 U.S.C. § 119(a) to Korean application number 10-2019-0112829, filed on Sep. 11, 2019, in the Korean Intellectual Property Office, which is incorporated herein by reference in its entirety.

BACKGROUND

1. Technical Field

Various embodiments generally relate to a semiconductor integrated apparatus, and more particularly, to a data processing apparatus and an operation method thereof.

2. Related Art

Recently, research is conducted on various arbitration techniques for improving access efficiency to a shared resource such as a shared memory in a semiconductor integrated apparatus having a plurality of devices integrated therein.

In order to arbitrate requests which one or more master devices may transmit to a slave device, the latency and priority of each of the requests may be considered. Through such consideration, it is desirable for the arbitration to be performed with maximum power efficiency and the lowest possible latency.

SUMMARY

In an embodiment, a data processing apparatus may include: a master device; a slave device; and a controller configured to arbitrate communication between the master device and the slave device by: setting a respective Time-out Counter (TC) for each of requests transmitted from the master device, allocating one or more virtual channels to each of one or more request groups, the one or more virtual channels respectively corresponding to priority levels, associating a request with a virtual channel corresponding to the priority level of the request, for each request group, selecting one of the leading requests of the respective virtual channels according to the TCs and transmitting the selected request to the slave device.

In an embodiment, a data processing apparatus may include: a master device; a slave device comprising a plurality of memory banks; and a controller configured to arbitrate communication between the master device and the slave device, wherein the controller comprises: a Time-Out Counter (TC) setting component configured to set respective TCs for requests transmitted from the master device according to the respective priority levels of the requests; a grouping component configured to group the requests in each request group into the virtual channels of the request group according to the respective priority levels of the requests; a virtual channel allocation component configured to allocate one or more virtual channels to each of the request groups; and a selection component configured to, for each request group, select a request based on the TCs of the leading requests of the virtual channels of the request group and output the selected request.

In an embodiment, there is an operation method of a data processing apparatus which includes a master device, a slave device having a plurality of destinations, and a controller configured to arbitrate communication between the master device and the slave device, the operation method comprising the steps of: setting, by the controller, respective Time-out Counters (TCs) for requests as the requests to be transmitted to any one of the plurality of destinations are received from the master device; generating, by the controller, request groups by sorting the requests according to the respective destinations of the requests; allocating, by the controller for each request group, the requests in the request group to one of a plurality of virtual channels of the request group according to the respective priority levels of the requests; and selecting, by the controller from each request group, any one request according to the TCs of the leading requests of the virtual channels of the request group and transmitting the selected request to the slave device.

DETAILED DESCRIPTION

Hereinafter, a data processing apparatus and an operation method thereof according to the present disclosure will be described below with reference to the accompanying drawings through illustrative embodiments.

Figure 1:
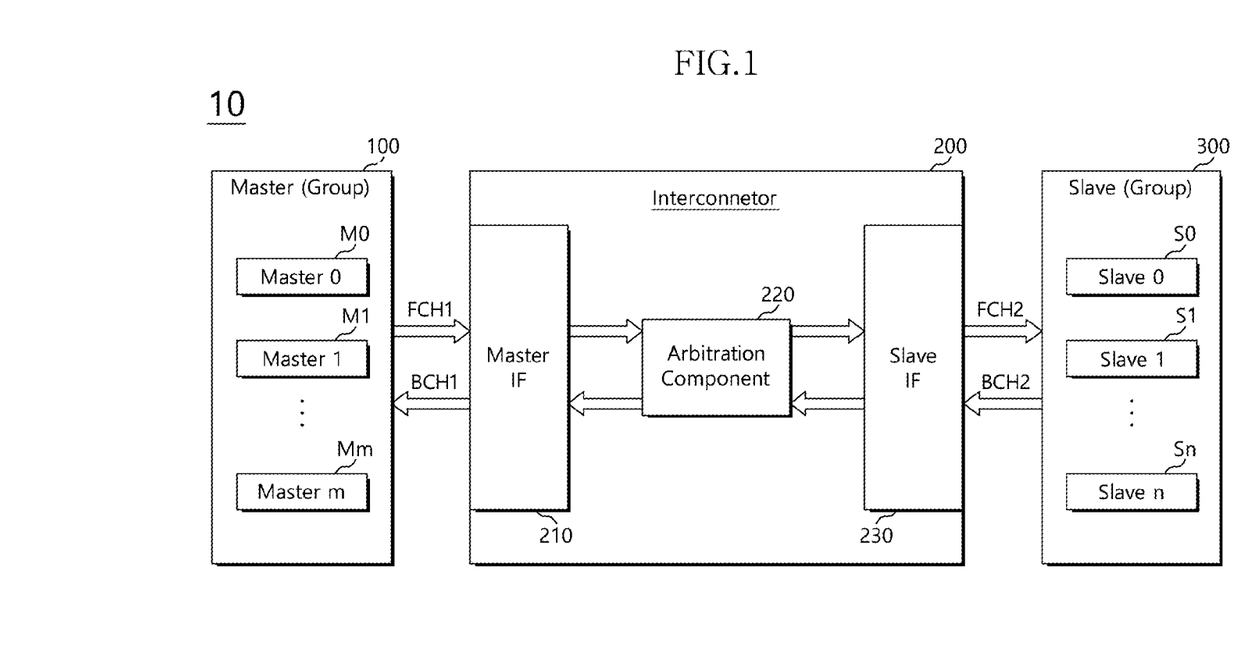
FIG. 1 is a configuration diagram illustrating a data processing apparatus in accordance with an embodiment.

FIG. 1 is a configuration diagram illustrating a data processing apparatus 10 in accordance with an embodiment.

The data processing apparatus 10 may include a master device 100, a slave device 300 and an interconnector 200.

The master device 100 may include one or more master IPs (Intellectual Properties) M0, M1, . . . Mm, and the slave device 300 may include one or more slave IPs S0, S1, . . . Sn.

The master device 100 may be referred to as a host device. The master device 100 may include among the master IPs M0 to Mm various processors such as a CPU (Central Processing Unit), a GPU (Graphics Processing Unit) and an application processor, or serve as a DMA (Direct Memory Access) or I/O (Input/Output) sub system.

In an embodiment, the master device 100 may transmit a request, which includes a command, a request ID, a slave address and data as in Table 1, through a first forward channel FCH1, and receive data corresponding to a request processing result and/or a response signal through a first backward channel BCH1.

TABLE 1

| Request | | | |
|---|---|---|---|
| Request ID | Command | Address | Data |

The slave device 300 may serve as a resource shared by the master device 100. In an embodiment, the slave device 300 may be a shared memory apparatus. In an embodiment, the slave device 300 may receive a command, data and address in a request of the master device through a second forward channel FCH2, and transmit data corresponding to a command processing result and/or a response signal through a second backward channel BCH2.

Between the master device 100 and the slave device 300, an address, data and a response signal may be transmitted through independent channels. However, embodiments are not limited thereto.

The interconnector 200 may be configured to arbitrate communication between the master device 100 and the slave device 300, and may in an embodiment be integrated into a memory controller for controlling the slave device 300 according to a request of the master device 100. The interconnector 200 may include a master interface 210, an arbitration component 220, and a slave interface 230.

The master interface 210 may receive a request of the master device 100 through the first forward channel FCH1 and transmit the received request to the arbitration component 220, and transfer a response signal and/or data provided from the slave device 300 to the master device 100 through the first backward channel BCH1.

The arbitration component 220 may be configured to schedule requests of the master device 100, transmitted through the first forward channel FCH1, according to priority and latency.

The slave interface 230 may transfer the scheduled requests to the slave device 300 through the second forward channel FCH2, and receive a response signal and/or data outputted from the slave device 300 through the second backward channel BCH2 and transfer the received response signal and/or data to the master interface 210 for delivery to the master device 100.

In an embodiment, the arbitration component 220 may group the requests transmitted from the master device 100 according to destination addresses and priority levels. Also, the arbitration component 220 may first sort the requests grouped according to the priority levels, in the order in which the requests arrive at the interconnector 200, and then manage the sorted requests as a linked list.

The arbitration component 220 may configure virtual channels corresponding to the priority levels, and the grouped and sorted requests may be transmitted to the slave device 300 through the respective virtual channels allocated according to the priority levels.

The arbitration component 220 may select one request which is the closest to expiration to be processed, among the leading requests of the respective virtual channels. In an embodiment, each request may be associated with a counter. The arbitration component 220 may select one request which is the closest to expiration of its counter, and transmit the selected request to the slave device 300 through the second forward channel FCH2 of the slave interface 230.

For this operation, the arbitration component 220 may assign unique IDs (unique priority IDs) to the respective requests transmitted from the master device 100 in consideration of the priority levels. In an embodiment, the master device 100 may assign an ID (request ID) to a request which the master device 100 will request the slave device 300 to process, and transmit the ID to the interconnector 200 through the first forward channel FCH1. The master device 100 may assign request IDs according to the preset priority levels of the respective requests. In other words, the request IDs may be generated in a form that indicates the priority levels. The arbitration component 220 may manage master identifiers capable of identifying the master IPs M0 to Mm constituting the master device 100, and generate the unique priority IDs by coupling the master identifiers and the request IDs.

The arbitration component 220 may set a TC (Time-Out Counter) for a request to which a unique priority ID is assigned. In an embodiment, the higher the priority level, the smaller the value (i.e., for shorter latency) that the TC may be set to. However, the present embodiment is not limited thereto.

In this way, the data processing apparatus may allocate a plurality of requests to different virtual channels according to the priority levels thereof, and provide the slave device 300 with the request whose TC is the closest to expiration, among the leading requests for the respective virtual channels. Thus, the data processing apparatus may not only preferentially process a request with a higher priority level, but also prevent HOL (Head of Line) blocking for requests which are close to expiration, even though those requests may have low priority levels.

Figure 2:
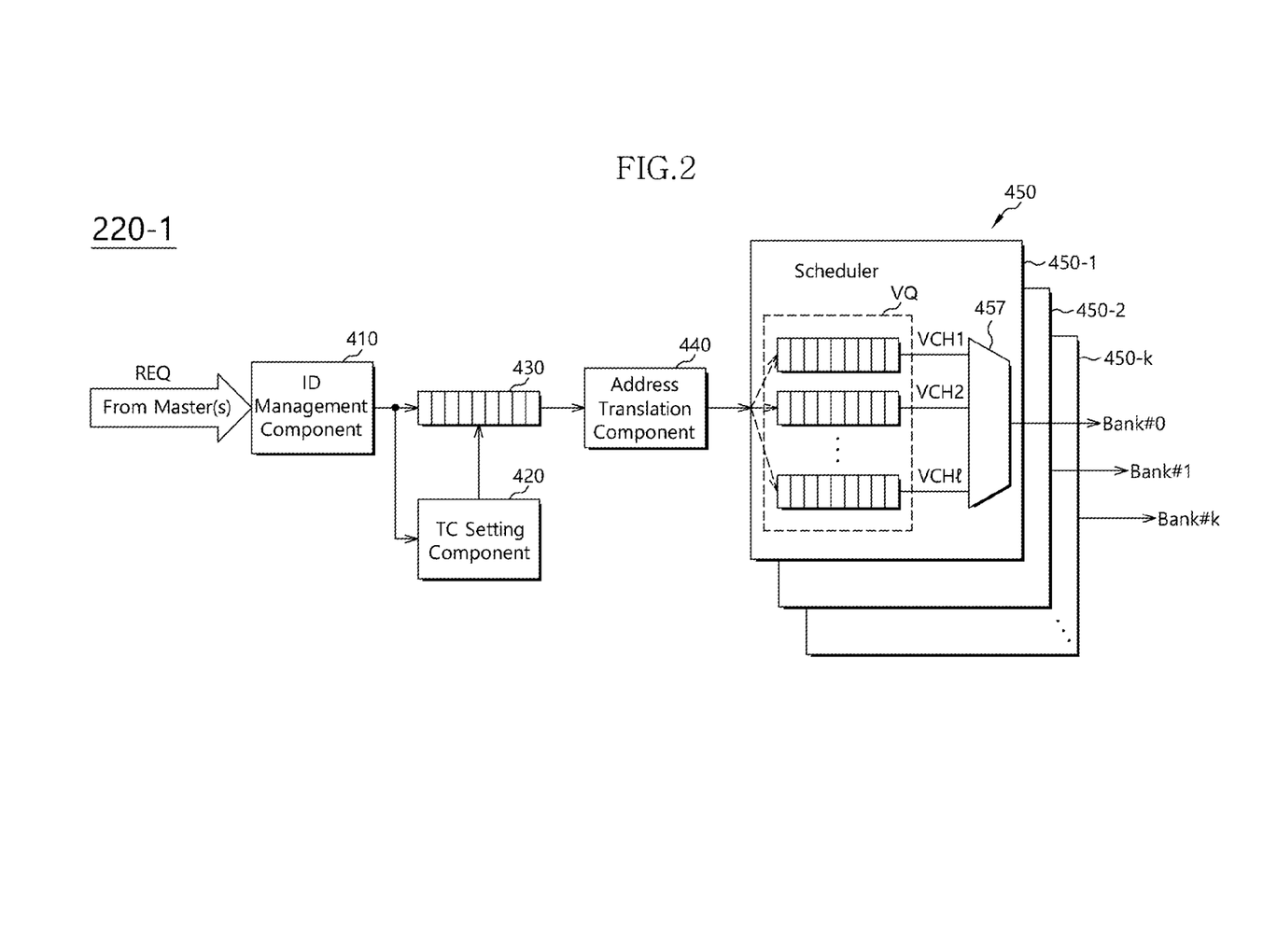
FIG. 2 is a configuration diagram illustrating an arbitration component in accordance with an embodiment.

FIG. 2 is a configuration diagram illustrating an arbitration component 220-1 in accordance with an embodiment.

The arbitration component 220-1 may include an ID management component 410, a TC setting component 420, a request holding component 430, an address translation component 440 and a scheduler 450.

As the master device 100 transmits requests REQ each including a request ID, a command, a slave address and data, the ID management component 410 may generate unique priority IDs by merging a master identifier and the request IDs, such as, for example, by using the master identifier to set some bits of the unique priority IDs and using the request IDs to set other bits of the unique priority IDs. The request IDs included in the requests transmitted by the master device 100 may be assigned according to priority levels P_level1 to P_levell. Thus, the unique priority IDs generated by the ID management component 410 may be generated in such a form that can identify the priority levels P_level1 to P_levell of the requests.

The TC setting component 420 may set a TC for each of the requests to which the unique priority IDs are assigned. In an embodiment, the higher the priority level, the smaller the value the TC may be set to a smaller value so that requests with higher priority levels are scheduled with shorter latency.

The requests may be stored in individual entries of the request holding component 430 according to the order of arrival. The unique priority ID, the command, the address, the data and the TC value for each of the requests may be stored in the corresponding entry of the request holding component 430. The TC may be down-counted in each preset period after the requests are stored in the request holding component 430, for example, in response to a clock signal.

The address translation component 440 may translate the addresses included in the respective requests into addresses of the slave device 300, in order to identify destination bank addresses which may range from 0 to k. Each request may then by assigned to one of the bank schedulers 450-1, 450-2, . . . 450-k according to the destination bank address of the request. In embodiments, each of the bank schedulers 450-1, 450-2, . . . 450-k operates in parallel and independently of the other bank schedulers 450-1, 450-2, . . . 450-k to schedule the requests routed thereto. Accordingly, each bank schedulers 450-1, 450-2, . . . 450-k includes a respective virtual queue VQ feeding respective virtual channels VCH1 to VCHl and a selection component 457. The following description describes operation of the scheduler 450, but in embodiments discloses the operation of one or more of the bank schedulers 450-1, 450-2, . . . 450-k. In embodiments, the bank schedulers 450-1, 450-2, . . . 450-k are implemented by firmware of the arbitration component 220 according to the number of banks.

The scheduler 450 may group the requests having the same destination bank addresses according to the priority levels P_level1 to P_levell, and allocate virtual channels VCH1 to VCHl to the respective request groups. Also, the scheduler 450 may select any one request based on the TCs of the leading requests waiting to be outputted through the respective virtual channels VCH1 to VCHl, and provide the selected request to the slave device 300.

Figure 3:
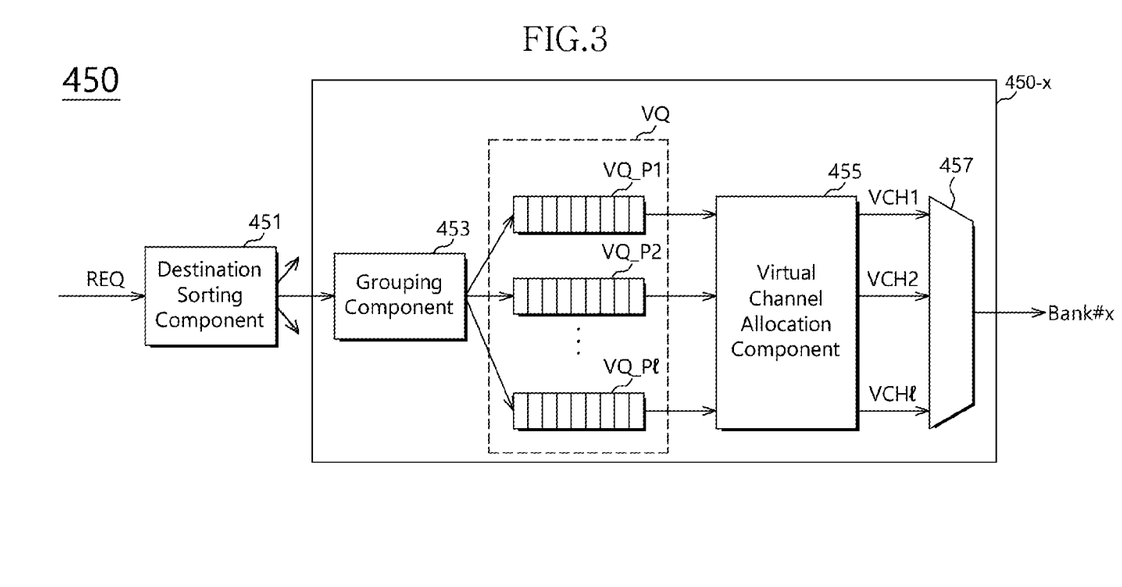
FIG. 3 is a configuration diagram illustrating a scheduler in accordance with an embodiment.

FIG. 3 is a configuration diagram illustrating the scheduler 450 in accordance with the embodiment.

The scheduler 450 may include a destination sorting component 451, and one or more bank schedulers 450-x scheduling requests for a Bank #x. Each bank schedulers 450-x may include a grouping component 453, a virtual channel allocation component 455 and a selection component 457.

The destination sorting component 451 may sort input requests for each of the destinations by referring to the address information of the input requests. In an embodiment, the slave device 300 may be a memory apparatus including a plurality of memory banks Bank #0 to Bank #k, and the address information of the requests may include bank addresses. The destination sorting component 451 may sort requests according to the bank addresses of the requests, and route requests having the same bank addresses to a same bank scheduler. For example, in an embodiment, the destination sorting component 451 routes requests having a bank address x to a bank scheduler 450-x, for x in 0 . . . k, each bank scheduler 450-x corresponding to a respective memory bank Bank #x.

The grouping component 453 may group requests for the same destinations (i.e. same bank addresses) according to the priority levels P_level1 to P_levell, by referring to the unique priority IDs of the respective requests. The grouping component 453 may manage the requests belonging to each of the request groups as a linked list according to the order in which the requests have arrived at the interconnector 200. The grouped requests may wait in a virtual queue VQ for each of the groups. In an embodiment, the request group having the first priority level P_level1 may wait in a first virtual queue VQ_P1, the request group having the second priority level P_level2 may wait in a second virtual queue VQ_P2, and the request group having the eth priority level P_levell may wait in an Eth virtual queue VQ_PE.

The virtual channel allocation component 455 may configure a predetermined number of virtual channels VCH1 to VCHl corresponding to the priority levels P_level1 to P_levell of the requests, and allocate the virtual channels VCH1 to VCHl to the respective request groups. In an embodiment wherein the requests are stored in the common request holding component 430 of FIG. 2, the virtual channel allocation component 455 may manage data structures that organize the requests into the virtual queues VQ_P1 to VQ_PE and may select the head of each virtual queue (that is, the leading requests in the virtual queues) for delivery to the selection component 457. In an embodiment, delivering a request to the selection component 457 does not cause the head of the corresponding virtual queue VQ to be changed. When a response to the request is received, the leading requests of the corresponding virtual queue VQ is removed, and the next request in that virtual queue VQ becomes the head of that virtual queue VQ.

The selection component 457 may select the request whose TC is the closest to expiration, among the leading requests of the virtual queues VQ_P1 to VQ_PE for the respective virtual channels VCH1 to VCHl, and provide the selected request to the corresponding bank Bank #x.

In an embodiment, the slave device 300 may be a memory apparatus including a plurality of banks. The scheduler 450 may group the requests for the same bank addresses according to the priority levels P_level1 to P_levell, and allocate the virtual channels VCH1 to VCHl to the respective priority levels P_level1 to P_levell. Therefore, the requests grouped for a specific bank according to the priority levels P_level1 to P_levell wait in the corresponding virtual channels VCH1 to VCHl, and the request whose TC is the lowest, among the leading requests of the respective virtual channels, may be selected and transferred to the corresponding bank Bank #x through the second forward channel FCH2.

The arbitration component 220-1 illustrated in FIG. 2 may operate the common request holding component 430 regardless of the destination addresses, which makes it possible to maximize the utilization efficiency of the request holding component 430. That is, in an embodiment, all of the requests in all of the virtual queues VQ_P1 to VQ_PE of FIG. 3 may be physically stored in the request holding component 430 of FIG. 2.

Figure 4:
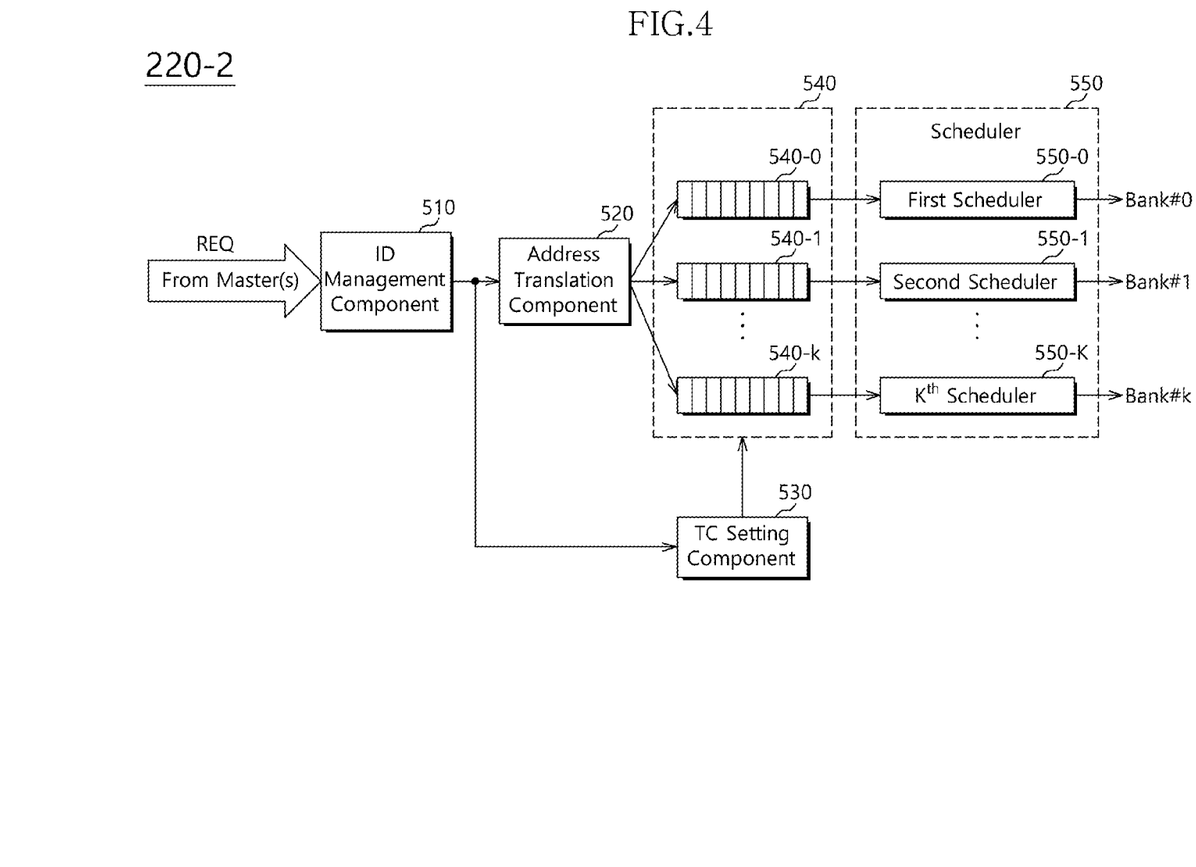
FIG. 4 is a configuration diagram illustrating an arbitration component in accordance with another embodiment.

FIG. 4 is a configuration diagram illustrating an arbitration component 220-2 in accordance with another embodiment.

The arbitration component 220-2 may include an ID management component 510, an address translation component 520, a TC setting component 530, a request holding component 540 and a scheduler 550.

The arbitration component 220-2 illustrated in FIG. 4 may be distinguished from the arbitration component 220-1 of FIG. 2 in that independent request holding components 540 are provided for respective destination addresses (e.g., for each bank).

As the master device 100 transmits requests REQ each including a request ID, a command, a slave address and data, the ID management component 510 may generate unique priority IDs by coupling a master identifier and the request IDs. Since the request IDs transmitted by the master device 100 are assigned according to the priority levels P_level1 to P_levell (enabling the priority level of a request may be determined from the request ID), the unique priority IDs generated by the ID management component 510 may be generated in such a form that the priority levels P_level1 to P_levell of the requests may be determined from the unique priority IDs.

The address translation component 520 may translate the addresses included in the respective requests into addresses of the slave device 300, in order to identify destination bank addresses which may have values from 0 to k respectively corresponding to Bank #0 to Bank #k in the slave device 300. The requests whose destination bank addresses are identified may be stored in the individual entries of the request holding components 540-0 to 540-k provided for the respective bank destinations, according to the order of arrival. In an embodiment, the slave device 300 may be a memory apparatus including a plurality of memory banks Bank #0 to Bank #k, and the request holding components 540-0 to 540-k may be provided for the memory banks Bank #0 to Bank #k, respectively.

The TC setting component 530 may set a TC to each of the requests to which the unique priority IDs are assigned. In an embodiment, the higher the priority level indicated by a unique priority ID, the smaller the value the TC of the corresponding request may be set to, so that higher priority requests are handled with shorter latency. Thus, the unique priority ID, the command, the address, the data and the TC value for each of the requests may be stored in the corresponding entry of the request holding component 540. The TC may be down-counted in response to a clock signal, for example, in each preset period after the requests are stored in the request holding component 540.

The scheduler 550 may include a plurality of bank schedulers 550-0 to 550-k coupled to the request holding components 540-0 to 540-k for the respective destinations, respectively. The scheduler 550 may have substantially the same configuration as the scheduler 450 illustrated in FIG. 2.

That is, the scheduler 550 may group the requests having the same destination addresses according to the priority levels P_level1 to P_levell, and allocate virtual channels VCH1 to VCHl to the respective request groups. Also, for each request group, the scheduler 550 may select any one request based on the TCs of the leading requests waiting to be outputted through the respective virtual channels VCH1 to VCHl, and provide the selected request to the slave device 300. Each of the bank schedulers 550-0 to 550-k may be configured as described with reference to FIG. 3, but the present embodiment is not limited thereto. In an embodiment wherein a bank scheduler 550-x is configured similarly to as described for the bank scheduler 450-x of FIG. 3, the virtual channel allocation component of the bank scheduler 550-x allocates and manages virtual queues of the bank scheduler 550-x by managing the storage, retrieval, and removal of requests in the corresponding request holding component 540-x.

FIGS. 5A to 5D are diagrams for describing a request virtualization concept, and show operations regarding virtual queues of one request group.

The illustrative example shown in FIGS. 5A to 5D are based on the supposition that requests of the master device 100 are sorted into three groups according to the priority levels P_level1 to P_level3, and transferred to the same destination Bank #0 through the respective virtual channels VCH1 to VCH3. The priority level P_level1 is the first (highest) priority level, the priority level P_level2 is the second priority level, and the priority level P_level3 is the third priority level.

Figure 5A:
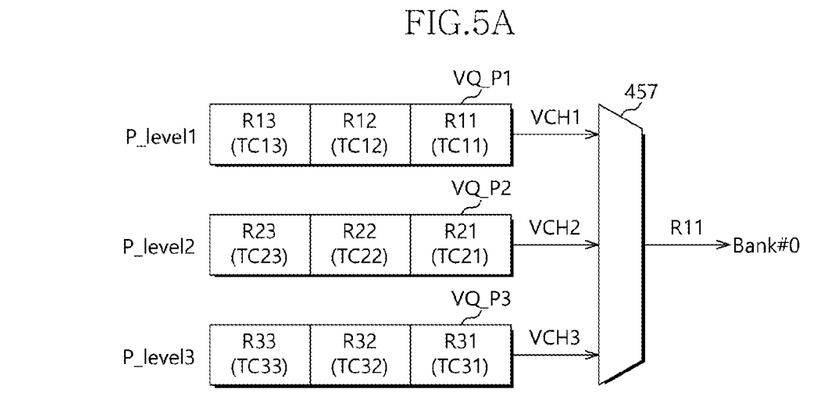
FIGS. 5A, 5B, 5C, and 5D illustrate a request transmission channel virtualization concept.

Referring to FIG. 5A, the scheduler 450 or 550 may sort requests, in which unique priority IDs and TCs are set, for the destination Bank #0, such that requests R11 to R13 having the first priority level P_level1 may wait in the first virtual queue VQ_P1 according to the order in which the requests has arrived at the arbitration component 220, 220-1 or 220-2. Requests R21 to R23 having the second priority level P_level2 may wait in the second virtual queue VQ_P2 according to the order in which the requests has arrived at the arbitration component 220, 220-1 or 220-2, and requests R31 to R33 having the third priority level P_level3 may wait in the third virtual queue VQ_P3 according to the order in which the requests has arrived at the arbitration component 220, 220-1 or 220-2.

The selection component 457 of the scheduler 450 or 550 may compare the TCs (TC11, TC21, and TC31, respectively) of the leading requests R11, R21 and R31 of the respective virtual queues VQ_P1 to VQ_P3, and when TC11≤TC21≤TC31, may select the request R11 which is the closest to expiration (that is, the closest to zero), and transmit the selected request R11 to the destination Bank #0.

During such a process, the TCs of the respective requests are continuously down-counted. In an embodiment, a TC that is at zero remains at zero when down-counted.

Figure 5B:
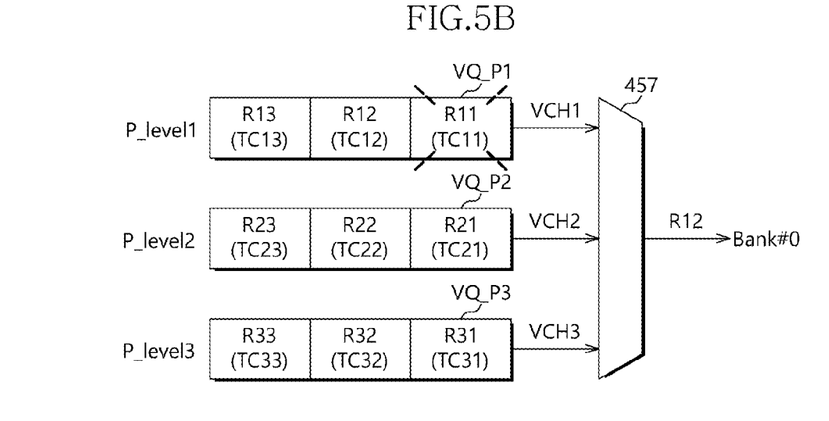

Referring to FIG. 5B, the leading requests of the respective virtual queues VQ_P1 to VQ_P3 are changed to the requests R12, R21 and R31, after the request R11 of the first priority level was transferred to the destination Bank #0 (as indicated by the crossing out of request R11). When a relation of TC12≤TC21≤TC31 is satisfied, the selection component 457 selects the request R12 and transfers the selected request to the destination Bank #0, as illustrated in FIG. 5B.

Figure 5C:
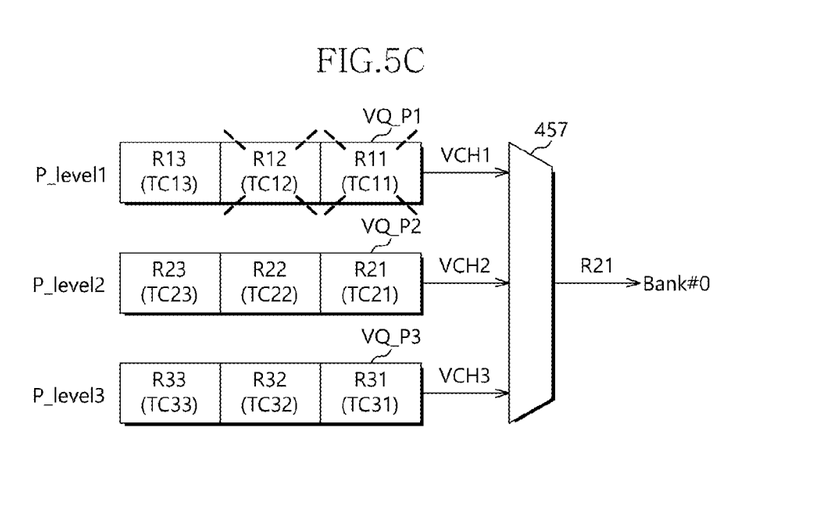
Figure 5D:
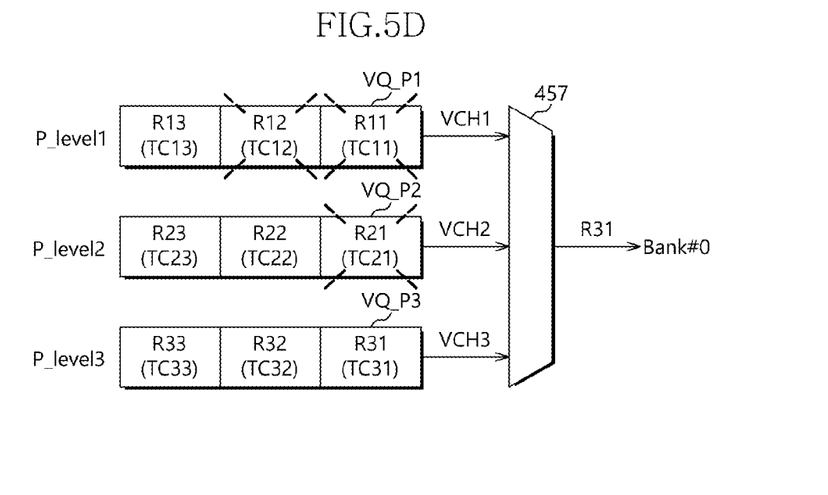

The TCs of the respective requests are then again down-counted. When a relation of (TC21≤TC31 and TC21<TC13) is satisfied, the selection component 457 selects the request R21 as illustrated in FIG. 5C. Subsequently, after the TCs are again down-counted, when a relation of (TC31<TC13 and TC31<TC22) is satisfied the selection component 457 selects the request R31 as illustrated in FIG. 5D.

Figure 6:
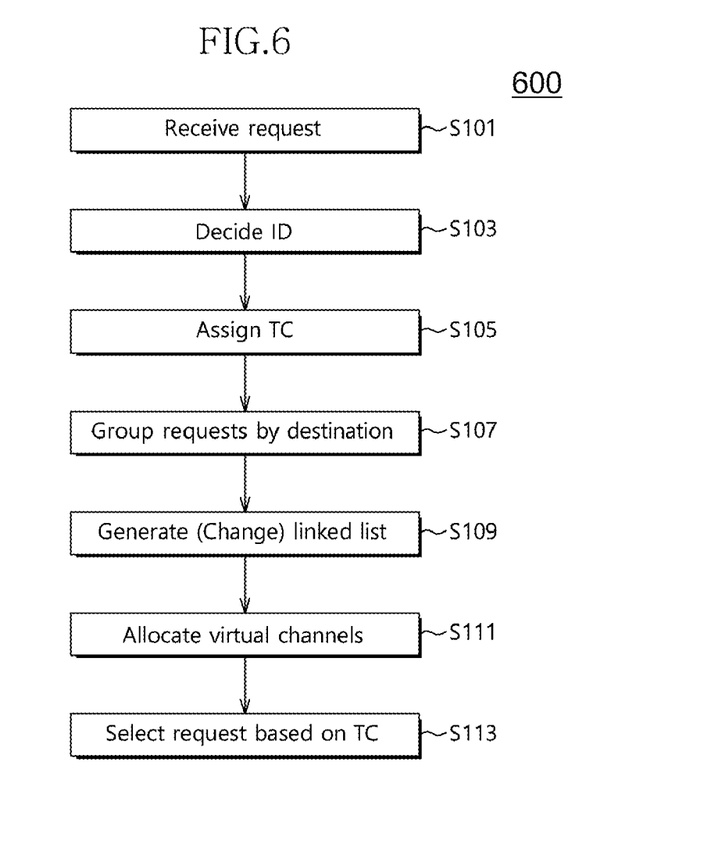
FIG. 6 is a flowchart illustrating an operation method of a data processing apparatus in accordance with an embodiment.

FIG. 6 is a flowchart illustrating an operation process 600 of the data processing apparatus in accordance with an embodiment.

As the master device 100 transmits requests REQ each including a request ID assigned according to the priority level thereof, a command, a slave address (ex. memory bank address) and data in step S101, the arbitration component 220, 220-1 or 220-2 may generate unique priority IDs by merging a master identifier and the request IDs in step S103. The request IDs included in the requests transmitted by the master device 100 may be assigned according to the priority levels P_level1 to P_levell. Thus, the unique priority IDs generated by the arbitration component 220, 220-1 or 220-2 may be generated in a form that can identify the priority levels P_level1 to P_levell of the requests.

The arbitration component 220, 220-1 or 220-2 may set a Timeout Counter (TC) for each of the requests to which the unique priority IDs are assigned in step S105. In an embodiment, the higher the priority level, of a request the smaller the value that the TC associated with that request may be set to, so that higher priority requests tend to be processed with shorter latency.

Each of the requests may be stored in the request holding component 430 or 540 within the arbitration component 220, 220-1 or 220-2 according to the order of arrival. The unique priority ID, the command, the address, the data and the TC value for each of the requests may be stored in the request holding component 430 or 540. The request holding component 430 or 540 may be configured as a FIFO queue, and provided for each of the plurality of slave devices or each of the destinations of the plurality of slave devices, or provided for the plurality of slave devices or destinations constituting the plurality of slave devices in common.

The TCs may be down-counted in response to a clock signal, for example, in each preset period after the requests are stored in the request holding component 430 or 540.

The arbitration component 220, 220-1 or 220-2 may group the requests having the same destination bank addresses according to the priority levels P_level1 to P_levell in step S107, and in an embodiment may manage the requests belonging to each of the request groups as a linked list, according to the order in which the requests has arrived at the arbitration component 220, 220-1 or 220-2, in step S109.

The arbitration component 220, 220-1 or 220-2 may configure a predetermined number of virtual channels VCH1 to VCHl corresponding to the priority levels P_level1 to P_levell of the requests for each of the destination bank addresses, and allocate the virtual channels VCH1 to VCHl to the respective request groups in step S111.

The requests may then wait in the virtual queues for the respective virtual channels VCH1 to VCHl of the respective request groups, and for each request group, the arbitration component 220, 220-1 or 220-2 may select the request whose TC is the closest to expiration, among the leading requests of the virtual queues for the respective channels VCH1 to VCHl, and provide the selected request to the slave device 300 in step S113.

In the present embodiment, the requests of the master device may be grouped according to the priority levels, and each of the request groups may wait to be outputted through the corresponding virtual channel. Among the leading requests waiting in the plurality of virtual channels, the request whose TC is the closet to expiration may be selected and transferred to the destination of the slave device.

That is, as the requests are reordered according to the priority levels, requests with higher priority levels may be preferentially processed.

In addition, when requests with different priority levels compete for output at the forefronts of the plurality of virtual channels, the TCs may be considered to prevent Head-of-Line (HOL) blocking for a specific virtual channel.

Figure 7:
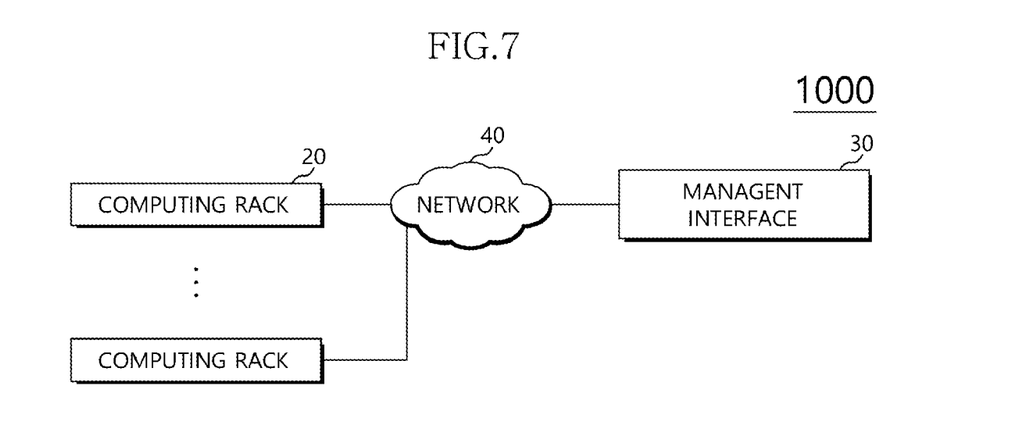
FIG. 7 is a configuration diagram illustrating a data processing system in accordance with an embodiment.

FIG. 7 is a configuration diagram illustrating a data processing system in accordance with an embodiment.

Referring to FIG. 7, the data processing system 1000 may include a plurality of computing racks 20, a management interface 30, and a network 40 for communications therebetween. The data processing system 1000 having such a rack-scale architecture may be used in a data center for processing big data, for example.

Each of the computing racks 20 may be combined with other computing racks 20 so as to implement one computing system. The specific configurations and operations of the computing racks 20 will be described below. In an embodiment, the computing racks 20 may be the data processing apparatuses 10 illustrated in FIGS. 1 to 4.

The management interface 30 may provide an interactive interface for enabling a user to control, operate or manage the data processing system 1000. The management interface 30 may be implemented as an arbitrary type of computing device including a computer, a multi-processor system, a server, rack-mount server, a board server, a lap-top computer, a notebook computer, a tablet computer, a wearable computing system, a network device, a web device, a distributed computing system, a processor-based system and/or a consumer electronic device.

In some embodiments, the data processing system 1000 may be implemented as a distributed system having computing functions which can be performed by the computing racks 20 or user interface functions which can be performed by the management interface 30. In other embodiments, the data processing system 1000 may be configured by multi-computing systems distributed through the network 40, and implemented as a virtual server operating as a cloud. The management interface 30 may include a processor, an I/O sub system, a memory, a data storage device and a communication circuit.

The network 40 may serve as a channel for transmitting/receiving data between the computing racks and the management interface 30 and/or between the computing racks. The network 40 may be implemented by wired and/or wireless networks. For example, the network 40 may be implemented by a wired or wireless LAN (Local Area Network), a WAN (Wide Area Network) cellular network and/or a publicly-accessible global network such as the Internet, or include the networks. In addition, the network 40 may include one or more auxiliary network devices such as auxiliary computers, routers and switches. Furthermore, the network 40 may include an interface network based on the interface standards such as CCIX (Cache Coherent Interconnect for accelerators) and GEN-Z.

Figure 8:
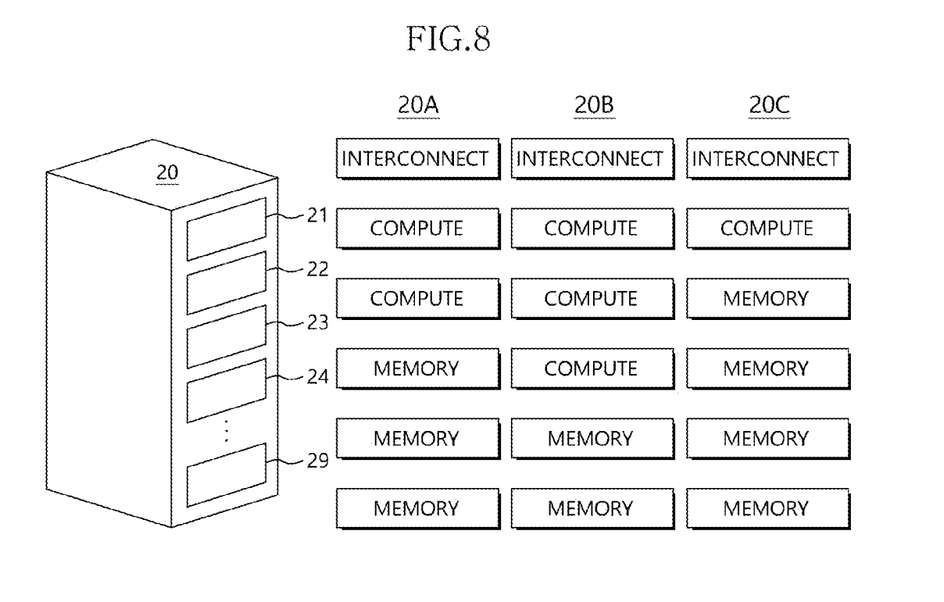
FIG. 8 is a conceptual view of a computing rack in accordance with an embodiment.

FIG. 8 is a conceptual view of a computing rack in accordance with an embodiment.

Referring to FIG. 8, the computing rack 20 may include various types of components, even though the structures, shapes and titles of the components are not limited. For example, the computing rack 20 may include a plurality of drawers 21 to 29. Each of the drawers 21 to 29 may include a plurality of boards.

In various embodiments, the computing rack 20 may be implemented by a combination of a proper number of compute boards COMPUTE, memory boards MEMORY and/or interconnect board INTERCONNECT. In the present embodiment, it is defined that the computing rack 20 is implemented by a combination of a plurality of boards. Instead, however, it may be defined that the computing rack 20 is implemented with various titles such as drawers, modules, trays, boards, chasses or units. The computing rack 20 may have a structure in which the components are classified and distinguished for respective functions for convenience of implementation. The computing rack 20 may have a structure in which the components are sequentially classified into the interconnect board, the compute boards and the memory boards from the top, but the present embodiment is not limited thereto. The computing rack 20 and the computing system implemented by the computing rack 20 may be referred to as "rack-scale system" or "disaggregated system". The memory board may be referred to as a memory system.

In various embodiments, the computing system may be implemented by one computing rack 20. Instead, the computing system may be implemented by all components included in two or more computing racks, implemented by a combination of some components included in two or more computing racks, or implemented by some components included in one computing rack 20.

In various embodiments, the computing system may be implemented by a combination of a proper number of compute boards, memory boards and/or interconnect board included in the computing rack 20. For example, a computing system 20A may be implemented by two compute boards COMPUTE, three memory boards MEMORY and one interconnect board INTERCONNECT. For another example, a computing system 20B may be implemented by three compute boards COMPUTE, two memory boards MEMORY and one interconnect board INTERCONNECT. For still another example, a computing system 20C may be implemented by one compute board COMPUTE, four memory boards MEMORY and one interconnect board INTERCONNECT.

Although FIG. 8 illustrates the case in which the computing rack 20 is implemented by a combination of a proper number of compute boards, memory boards and/or interconnect board, the computing rack 20 may include additional components such as a power system, a cooling system and I/O devices, which can be checked in a typical server or the like.

Figure 9:
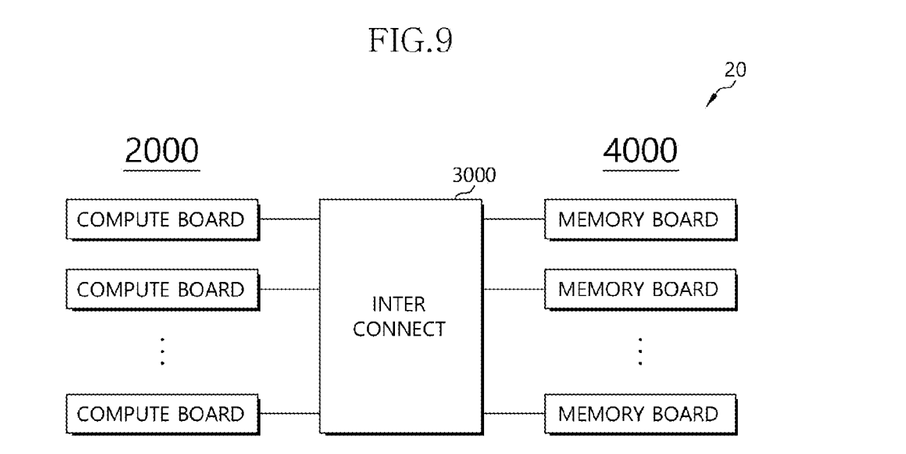
FIG. 9 is a configuration diagram illustrating a computing rack in accordance with an embodiment.

FIG. 9 is a configuration diagram illustrating a computing rack in accordance with an embodiment.

Referring to FIG. 9, the computing rack 20 may include a plurality of compute boards 2000, a plurality of memory boards 4000 and an interconnect board 3000. The plurality of compute boards 2000 may be referred to as pooled compute boards, pooled compute systems or the like. Similarly, the plurality of memory boards 4000 may be referred to as pooled memory boards, pooled memory systems or the like. In the present embodiment, it is defined that the computing system is implemented by a combination of a plurality of boards. Instead, however, it may be defined that the computing system is implemented with various titles such as drawers, modules, trays, boards, chasses or units.

Each of the compute boards 2000 may include hardware such as one or more processors, a processing/control circuit or a CPU and a processing element to which software executable in hardware is coupled.

Each of the memory boards 4000 may include various types of memories such as a plurality of volatile memories and/or nonvolatile memories. For example, the plurality of memory boards 4000 may include a plurality of DRAMs (Dynamic Random Access Memories), flash memories, memory cards, HDDs (Hard Disk Drives), SSDs (Solid State Drives) and/or combinations thereof.

Each of the memory boards 4000 may be divided, allocated or designated by one or more processing elements included in each of the compute boards 2000, and then used. Each of the memory boards 4000 may store one or more OSs (Operating Systems) which can be initialized and/or performed by the compute boards 2000.

The interconnect board 3000 may be implemented by a random communication circuit, a random device or a combination thereof, which can be divided, allocated or designated by one or more processing elements included in each of the compute boards 2000 and then used. For example, the interconnect board 3000 may be implemented as a random number of network interface ports, cards or switches. The interconnect board 3000 may use protocols related to one or more wired or wireless communication technologies for executing communication. For example, the interconnect board 3000 may support communications between the compute boards 2000 and the memory boards 4000 according to protocols such as PCIe (Peripheral Component Interconnect Express), QPI (QuickPath Interconnect) and Ethernet. Furthermore, the interconnect board 3000 may be connected to the compute boards 2000 according to the interface standards such as CCIX and GEN-Z.

Figure 10:
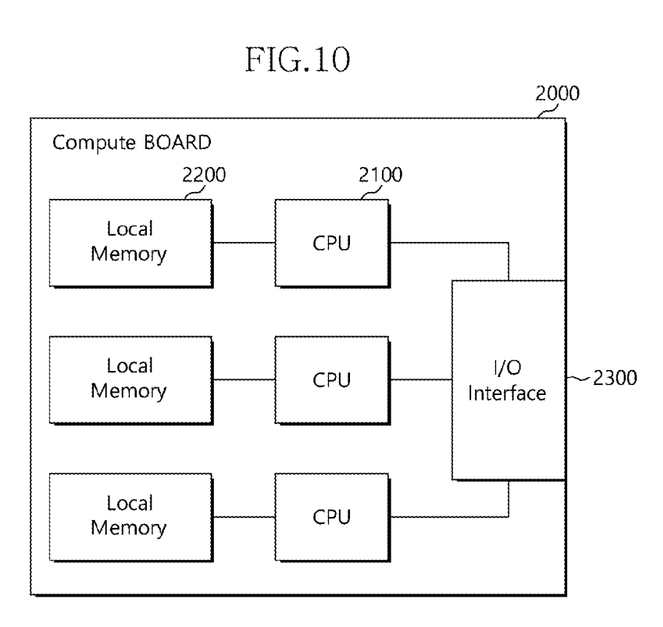
FIG. 10 is a configuration diagram illustrating a compute board in accordance with an embodiment.

FIG. 10 is a configuration diagram illustrating a compute board in accordance with an embodiment.

Referring to FIG. 10, the compute board 2000 may include one or more CPUs 2100, one or more local memories 2200 and an I/O interface 2300.

The CPU 2100 may divide, allocate or designate one or more memory boards which are to be used among the plurality of memory boards 4000 illustrated in FIG. 9. The CPU 2100 may initialize the one or more divided, allocated or designated memory boards, and perform a data read operation, a data write (or program) operation or the like through the memory boards.

The local memory 2200 may store data which are required during the operation of the CPU 2100. In various embodiments, the compute board may have a structure in which one local memory 2200 corresponds one-to-one to one CPU 2100.

The I/O interface 2300 may support interfacing between the CPU 2100 and the memory boards 4000 through the interconnect board 3000 of FIG. 9. The I/O interface 2300 may output Tx data from the CPU 2100 to the interconnect board 3000 and input Rx data from the interconnect board 3000 to the CPU 2100, using protocols related to one or more wired or wireless communication technologies. For example, the I/O interface 2300 may support communication between the CPU 2100 and the interconnect board 3000 according to the protocols such as PCIe, QPI and Ethernet. Furthermore, the I/O interface 2300 may support communication between the CPU 2100 and the interconnect board 3000 according to the interface standards such as CCIX and GEN-Z.

Figure 11:
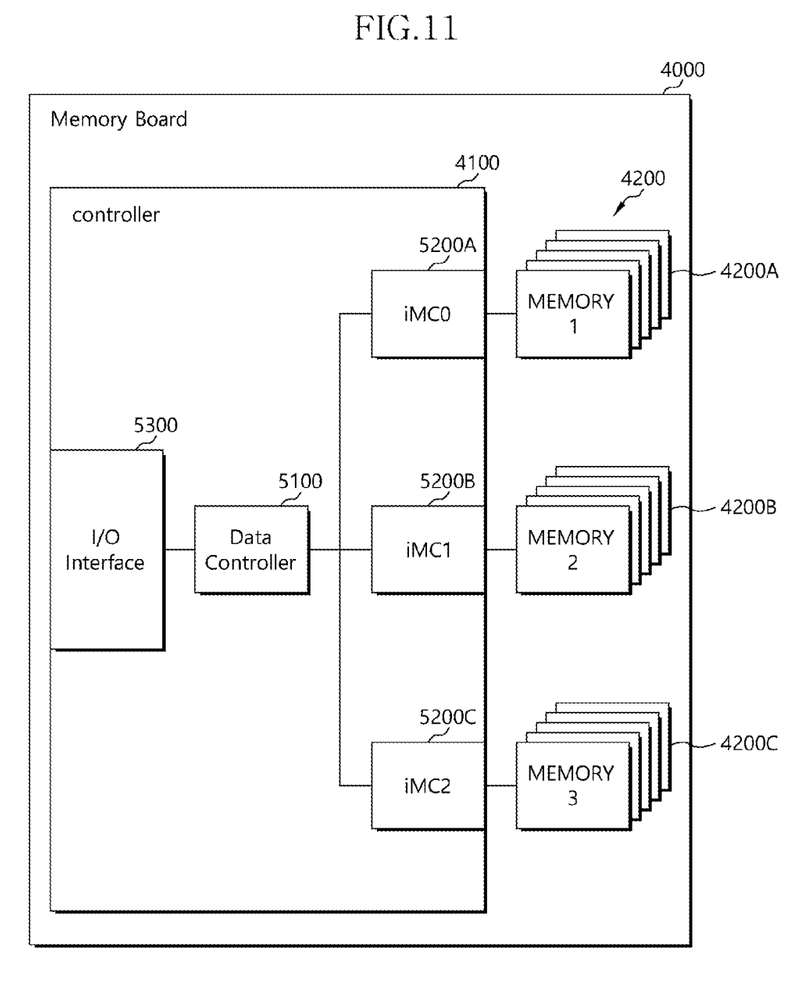
FIG. 11 is a configuration diagram illustrating a memory board in accordance with an embodiment.

FIG. 11 is a configuration diagram illustrating a memory board in accordance with an embodiment.

Referring to FIG. 11, the memory board 4000 may include a controller 4100 and a plurality of memory groups 4200. The memory group 4200 may include one or more types of memory apparatuses 4200A, 4200B and 4200C. The memory devices 4200A, 4200B and 4200C may store (or write) data or output (or read) the stored data, under control of the controller 4100. The plurality of memory groups 4200 may include a first memory apparatus 4200A, a second memory apparatus 4200B and a third memory apparatus 4200C. The first to third memory apparatuses 4200A to 4200C may have the same characteristics or have different characteristics. In various embodiments, the first to third memory apparatuses 4200A to 4200C may be memory apparatuses having the same characteristics or different characteristics in terms of storage capacity or latency.

While various embodiments have been described above, it will be understood to those skilled in the art that the embodiments described are examples only. Accordingly, the operation method of a data storage device described herein should not be limited based on the described embodiments.

What is claimed is:

1. A data processing apparatus comprising:
   a master device configured to transmits request information including one or more request identifiers (IDs) assigned according to one or more corresponding priority levels;
   a slave device; and
   a controller configured to arbitrate communication between the master device and the slave device by:
      setting a respective Time-out Counter (TC) for each of requests transmitted from the master device,
      allocating one or more virtual channels to each of one or more request groups, the one or more virtual channels respectively corresponding to the priority levels,
      associating a request with a virtual channel corresponding to the priority level of the request,
      for each request group, selecting one of the leading requests of the respective virtual channels according to the TCs and transmitting the selected request to the slave device, and
      generating unique priority IDs based on the request IDs and an identifier of the master device having transmitted the requests, wherein the controller comprises a request holding circuit configured to store the request information including the priority IDs and the TCs.

2. The data processing apparatus according to claim 1, wherein the request holding circuit is further configured to store the requests according to an order of arrival, and manages a processing order of one or more requests included in the same request group as a linked list according to the order of arrival.

3. The data processing apparatus according to claim 1, wherein the slave device comprises a plurality of destinations,
wherein the request holding circuit is provided for each of the plurality of destinations and configured to store the requests according to an order of arrival.

4. The data processing apparatus according to claim 1, wherein the slave device comprises a plurality of destinations,
wherein the request holding circuit is provided for the plurality of destinations in common and configured to store the requests according to an order of arrival.

5. The data processing apparatus according to claim 1, wherein the slave device comprises a plurality of destinations,
wherein the controller sorts the requests according to the destinations into the request groups, and groups the requests for each of the destinations according to the priority levels.

6. The data processing apparatus according to claim 1, wherein the slave device comprises a memory device including a plurality of memory banks,
wherein the controller sorts the requests according to the memory bank addresses into the request groups, and groups the requests for each of the memory banks according to the priority levels.

7. A data processing apparatus comprising:
a master device configured to transmits request information including one or more request identifiers (IDs) assigned according to one or more corresponding priority levels;
a slave device comprising a plurality of memory banks; and
a controller configured to arbitrate communication between the master device and the slave device,
wherein the controller comprises:
a Time-Out Counter (TC) setting circuit configured to set respective TCs for requests transmitted from the master device according to the respective priority levels of the requests;
an ID management circuit configured to generate unique priority IDs according to the request IDs and an identifier of the master device,
a grouping circuit configured to group the requests in each request group into the virtual channels of the request group according to the respective unique priority IDs;
a virtual channel allocation circuit configured to allocate one or more virtual channels to each of the request groups; and
a selection circuit configured to, for each request group, select a request based on the TCs of the leading requests of the virtual channels of the request group and output the selected request.

8. The data processing apparatus according to claim 7, wherein the controller further comprises a request holding circuit provided for each of the memory banks and configured to store the requests according to an order of arrival.

9. The data processing apparatus according to claim 7, wherein the controller further comprises a request holding circuit provided for the plurality of memory banks in common and configured to store the requests according to an order of arrival.

10. The data processing apparatus according to claim 7, wherein the selection circuit selects the request whose TC is the closest to expiration, among the leading requests.

11. An operation method of a data processing apparatus which includes a master device, a slave device having a plurality of destinations, and a controller configured to arbitrate communication between the master device and the slave device, the operation method comprising the steps of:
providing, by the master deice, requests respectively include request identifiers (IDs) being assigned according to corresponding priority levels of the requests;
setting, by the controller, respective Time-out Counters (TCs) for requests as the requests to be transmitted to any one of the plurality of destinations are received from the master device;
generating, by the controller, unique priority IDs based on the request IDs and an identifier of the master device that transmitted the requests;
generating, by the controller, request groups by grouping the requests according to the respective destinations of the requests;
allocating, by the controller for each request group, the requests in the request group to one of a plurality of virtual channels of the request group according to the respective priority levels of the requests;
selecting, by the controller from each request group, any one request according to the TCs of the leading requests of the virtual channels of the request group and transmitting the selected request to the slave device, and
storing, by the controller, the request including the unique priority IDs and the TCs.

12. The operation method according to claim 11, wherein the operation method further comprises the step of managing, by the controller, one or more requests included in the same request group as a linked list according to an order of arrival.

13. The operation method according to claim 11, wherein the slave device comprises a plurality of destinations, and
wherein the operation method further comprises the steps of:
sorting, by the controller, the request groups according to the priority levels.

* * * * *